JAMES F. BROOMFIELD.
Improvement in Bee-Hives.

No. 114,912.

Patented May 16, 1871.

Witnesses:

Inventor:

United States Patent Office.

JAMES F. BROOMFIELD, OF RICHMOND, KENTUCKY.

Letters Patent No. 114,912, dated May 16, 1871.

IMPROVEMENT IN BEE-HIVES.

The Schedule referred to in these Letters Patent and making part of the same.

*To all whom it may concern:*

Be it known that I, JAMES F. BROOMFIELD, of Richmond, in the county of Madison and State of Kentucky, have invented a certain new and useful Improvement in Bee-Hives; and I do hereby declare the following to be a full, clear, and exact description thereof, reference being had to the accompanying drawing forming a part thereof, and in which—

Figure 1:
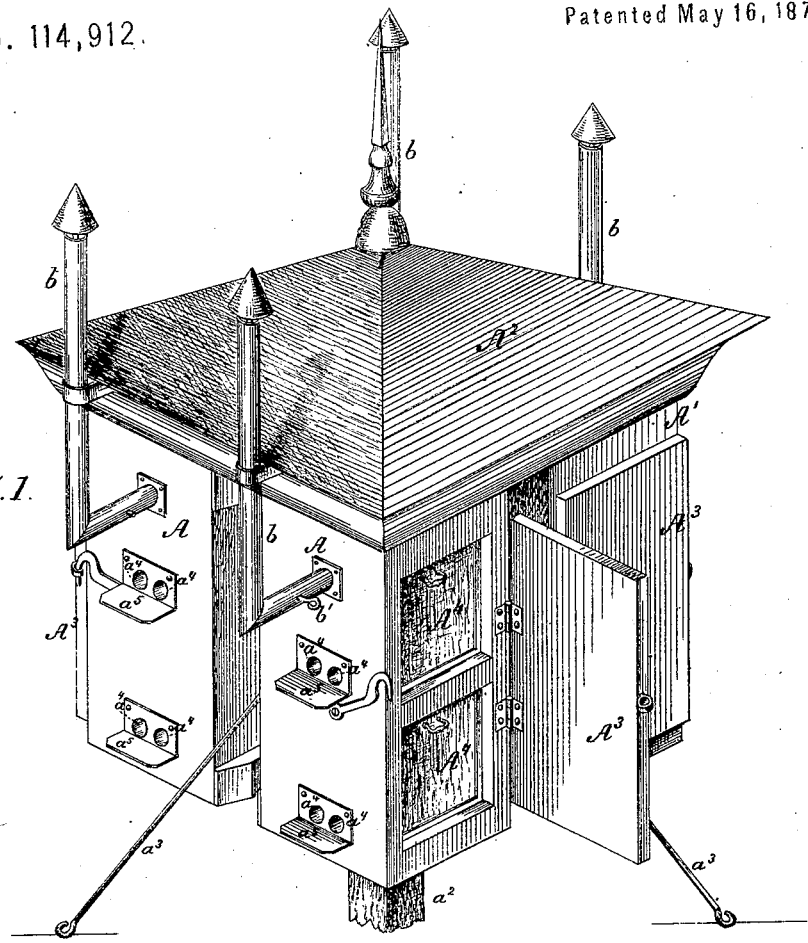
Figure 2:
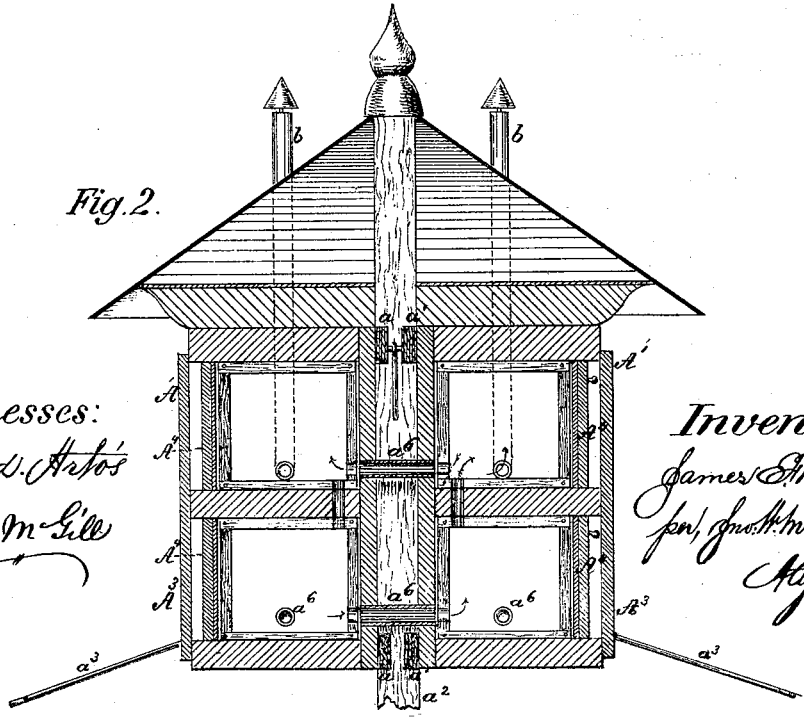

Figure 1 represents a perspective view of my bee-hive with one of the main doors thereof thrown open, exhibiting the smaller doors closing the upper and lower chambers of the honey-boxes; and Figure 2 is a vertical central section thereof.

This invention relates to bee-hives, and consists of a series of boxes, which communicate with each other by means of tubes, in combination with a receptacle to which each box is attached, and by means of which, when used with a post or standard secured in the ground, the said boxes may be supported and elevated above the ground, they being supplied with wire bars for more firmly holding the hive, which they partly constitute, thereon; of a series of ventilating tubes, and of inner removable doors for the upper and lower chambers of the honey-boxes.

Similar letters of reference indicate corresponding parts in the several figures of the annexed drawing.

In the said drawing—

$A\ A^1$ represent a series of boxes, of ordinary construction, which are supplied with the roof $A^2$, to which they are rigidly attached.

The two boxes $A\ A$ are connected together at top and bottom, on one side, by means of boards $a\ a$, and the two boxes $A^1\ A^1$ are connected together by boards $a^1\ a^1$, placed opposite boards $a\ a$.

The space between these boards form a receptacle, into which a post, $a^2$, is inserted, which, when inserted in the ground at its opposite end, will elevate the hive above the ground.

The wires $a^3\ a^3$, attached to the upper boards $a\ a^1$ in any suitable manner between the boxes, are attached at their lower ends to the post $a^2$, for the purpose of firmly securing the hive thereon, the object of which being to exclude insects from the hive.

$A^3\ A^3$ are the main or outer doors of the boxes, and by means of which access to the inner doors $A^4\ A^4$, which are removable and close the entrance to the upper and lower chambers of the boxes from that side of the hive or boxes to which the outer doors $A^3$ are hinged, is obtained.

By means of the inner removable doors $A^4\ A^4$ access can be had to each of the chambers of the boxes without disturbing the bees in any of the said chambers, excepting the one from which the honey is being taken, which could not be done by merely the use of the outer doors, as they would disturb the bees in both chambers of the boxes by their use, on account of the light which they admit thereto, and by their allowing the person removing the honey to be seen by the bees in the box or chamber not being disturbed, the same as by the bees in the chamber from which the honey is being removed.

The openings in the hive, indicated by the letters $a^4\ a^4$, allow the bees to enter and leave the same, and are provided with metal plates $a^5\ a^5$, which are for the purpose of allowing the bees to freely or readily enter the said openings.

$a^6\ a^6$ are tubes connecting and entering corresponding openings in the boxes $A\ A^1$ for the purpose of forming passages for the bees from one box to another.

The horizontal portions of the ventilating-tubes $b\ b$ enter the upper portions of the boxes $A\ A^1$, and are supplied with cut-offs, operated by the handles $b'\ b'$, their vertical portions being fastened to the roof $A^2$ by means of metallic straps and nails.

Having thus described my invention,

What I claim, and desire to secure by Letters Patent, is—

The boxes $A\ A^1$, supplied with the ventilating-tubes $b\ b$, having cut-offs $b'\ b'$, when arranged and connected together in sections upon a central standard, substantially as herein shown and described.

In testimony that I claim the foregoing improved bee-hive I have hereunto set my hand this 18th day of October, 1870.

JAMES F. + BROOMFIELD.
his mark.

Witnesses:
H. C. BROADDUS,
JOHN M. FRANCES.